(12) United States Patent
Zhang

(10) Patent No.: US 11,997,569 B2
(45) Date of Patent: *May 28, 2024

(54) BASE STATION AND SYSTEM FOR COMMUNICATION OF RRC SIGNALING AND AN SRS IN A TARGET SUBFRAME

(71) Applicant: HUAWEI TECHNOLOGIES CO., LTD., Guangdong (CN)

(72) Inventor: Lili Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,129

(22) Filed: Feb. 13, 2023

(65) Prior Publication Data

US 2023/0199442 A1 Jun. 22, 2023

Related U.S. Application Data

(63) Continuation of application No. 17/177,981, filed on Feb. 17, 2021, now Pat. No. 11,622,246, which is a (Continued)

(51) Int. Cl.
*H04W 4/18* (2009.01)
*H04L 5/00* (2006.01)
(Continued)

(52) U.S. Cl.
CPC ............... *H04W 4/18* (2013.01); *H04L 5/001* (2013.01); *H04L 5/0048* (2013.01);
(Continued)

(58) Field of Classification Search
CPC ............... H04W 4/18; H04W 72/0446; H04W 72/0453; H04W 72/23; H04W 80/08;
(Continued)

(56) References Cited

U.S. PATENT DOCUMENTS 10,979,868 B2    4/2021  Zhang
11,622,246 B2 *  4/2023  Zhang ................... H04L 5/0094
                                                         370/329
(Continued)

FOREIGN PATENT DOCUMENTS

CN    101895377    11/2010
CN    102299765    12/2011
(Continued)

OTHER PUBLICATIONS

3GPP TR 36.872 V12.1.0 (Dec. 2013), "3rd Generation Partnership Project; Technical Specification Group Radio Access Network; Small cell enhancements for E-UTRA and E-UTRAN—Physical layer aspects (Release 12)," Dec. 2013, 100 pages.

(Continued)

*Primary Examiner* — Omar J Ghowrwal
(74) *Attorney, Agent, or Firm* — Fish & Richardson P.C.

(57) ABSTRACT

Methods, apparatuses, and systems for transmitting an uplink signal between a plurality of carriers are disclosed. In an example method, user equipment receives indication signaling sent by a base station. The user equipment transmits an uplink signal in a target subframe of a corresponding target carrier based on the indication signaling.

19 Claims, 5 Drawing Sheets

Related U.S. Application Data continuation of application No. 16/090,344, filed as application No. PCT/CN2016/078343 on Apr. 1, 2016, now Pat. No. 10,979,868.

(51) Int. Cl.

| | | |
|---|---|---|
| *H04L 5/14* | (2006.01) | |
| *H04L 25/02* | (2006.01) | |
| *H04L 27/26* | (2006.01) | |
| *H04W 72/0446* | (2023.01) | |
| *H04W 72/0453* | (2023.01) | |
| *H04W 72/23* | (2023.01) | |
| *H04W 80/08* | (2009.01) | |

(52) U.S. Cl.
CPC .......... *H04L 5/0053* (2013.01); *H04L 5/0094* (2013.01); *H04L 5/0096* (2013.01); *H04L 5/14* (2013.01); *H04L 25/0226* (2013.01); *H04L 27/2607* (2013.01); *H04W 72/0446* (2013.01); *H04W 72/0453* (2013.01); *H04W 72/23* (2023.01); *H04W 80/08* (2013.01)

(58) Field of Classification Search
CPC ..... H04L 5/001; H04L 5/0048; H04L 5/0053; H04L 5/0094; H04L 5/0096; H04L 5/14; H04L 25/0226; H04L 27/2607
See application file for complete search history.

(56) References Cited

U.S. PATENT DOCUMENTS

| | | |
|---|---|---|
| 2012/0269114 A1 | 10/2012 | Oh et al. |
| 2012/0281654 A1 | 11/2012 | Aiba et al. |
| 2013/0010659 A1 | 1/2013 | Chen et al. |
| 2013/0028134 A1 | 1/2013 | Wang et al. |
| 2013/0039193 A1 | 2/2013 | Yin et al. |
| 2013/0083736 A1 | 4/2013 | Yin et al. |
| 2014/0023004 A1 | 1/2014 | Kumar et al. |
| 2014/0369242 A1 | 12/2014 | Ng et al. |
| 2015/0055521 A1 | 2/2015 | Seo et al. |
| 2016/0329993 A1 | 11/2016 | Kim et al. |
| 2017/0006626 A1 | 1/2017 | Lin et al. |
| 2017/0111944 A1 | 4/2017 | Tiirola et al. |
| 2017/0150475 A1 | 5/2017 | Li et al. |
| 2017/0279580 A1 | 9/2017 | Chen |
| 2018/0309496 A1 | 10/2018 | Lee et al. |
| 2019/0289605 A1* | 9/2019 | Futaki .................. H04W 72/23 |

FOREIGN PATENT DOCUMENTS

| | | |
|---|---|---|
| CN | 103378963 | 10/2013 |
| CN | 103416012 | 11/2013 |
| CN | 103814544 | 5/2014 |
| CN | 104488206 | 4/2015 |
| CN | 104685801 | 6/2015 |
| CN | 105340196 | 2/2016 |
| JP | 2008172792 | 7/2008 |
| JP | 2013038804 | 2/2013 |
| JP | 2013510475 | 3/2013 |
| JP | 2017516396 | 6/2017 |
| WO | WO2009099273 | 8/2009 |
| WO | WO2014060010 | 4/2014 |
| WO | WO2015161464 | 10/2015 |
| WO | WO2015163709 | 10/2015 |

OTHER PUBLICATIONS

3GPP TS 36.133 V11.16.0 (Mar. 2016), "3rd Generation Partnership Project; Technical Specification Group Radio Access Network; Evolved Universal Terrestrial Radio Access (E-UTRA); Requirements for support of radio resource management (Release 11)," Mar. 2016, 818 pages.

3GPP TS 36.211 V13.0.0 (Dec. 2015), "3rd Generation Partnership Project; Technical Specification Group Radio Access Network; Evolved Universal Terrestrial Radio Access (E-UTRA); Physical channels and modulation (Release 13)," XP051047447, Dec. 2015, 141 pages.

3GPP TS 36.212 V13.1 .0 (Mar. 2016), "3rd Generation Partnership Project; Technical Specification Group Radio Access Network; Evolved Universal Terrestrial Radio Access (E-UTRA); Multiplexing and channel coding (Release 13)," Mar. 29, 2016, 129 pages.

3GPP TS 36.213 V13.1 .1 (Mar. 2016), "3rd Generation Partnership Project; Technical Specification Group Radio Access Network; Evolved Universal Terrestrial Radio Access (E-UTRA); Physical layer procedures (Release 13)," Mar. 2016, 361 pages.

3GPP TS 36.214 V13.1.0 (Mar. 2016), "3rd Generation Partnership Project; Technical Specification Group Radio Access Network; Evolved Universal Terrestrial Radio Access (E-UTRA); Physical layer; Measurements (Release 13)," Mar. 2016, 18 pages.

3GPP TS 36.300 V13.2.0 (Dec. 2015), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," Dec. 2015, 290 pages.

3GPP TS 36.331 V13.0.0 (Dec. 2015), "3rd Generation Partnership Project; Technical Specification Group Radio Access Network; Evolved Universal Terrestrial Radio Access (E-UTRA); Radio Resource Control (RRC); Protocol specification Release 13)," Dec. 2015, 507 pages.

EP Communication Pursuant to Article 94(3) EPC in European Appln No. 20216273.1, dated Feb. 15, 2023, 7 pages.

EPO Communication pursuant to Article 94(3) EPC issued in European Application No. 16896078.9 dated Dec. 11, 2019, 7 pages.

Extended European Search Report in European Application No. 20216273.1, dated May 6, 2021, 10 pages.

Extended European Search Report issued in European Application No. 16896078.9 dated Feb. 4, 2019, 9 pages.

Extended European Search Report issued in European Application No. 20216273.1 dated May 6, 2021, 10 pages.

International Search Report and Written Opinion issued in International Application No. PCT /CN2016/078343 dated Jan. 5, 2017, 20 pages.

LC_MTC_L TE-Core, "Reply LS on half duplex FDD operation for Low complexity MTG UE," R1-141109 (R4-141235), Rel-12. Shenzhen, China, Mar. 31-Apr. 4, 2014, 1 page.

Office Action issued in Chinese Application No. 202110460525.3 dated Dec. 23, 2021, 14 pages (with English translation).

Office Action issued in Chinese Application No. 202110460525.3 dated May 26, 2022, 5 pages.

Office Action issued in Japanese Application No. 2018-551220 dated Feb. 16, 2021, 4 pages (with English translation).

Office Action issued in Japanese Application No. 2018-551220 dated Jul. 28, 2020, 6 pages (with English translation).

Office Action issued in Japanese Application No. 2018-551220 dated Sep. 17, 2019, 11 pages (with English translation).

Office Action issued in Malaysian Application No. PI 2018703574 dated Jul. 31, 2022, 3 pages.

Qualcomm Incorporated, "AGC and Frequency Error for D2D," 3GPP TSG-RAN WG4 #70, R4-140973, Prague, Czech Republic, Feb. 10-14, 2014, 3 pages.

Qualcomm Incorporated, "RF design considerations for eMTC," 3GPP TSG-RAN WG4 #75, R4-152889, May 25-29, 2015, 3 pages.

R1-154324, Huawei, HiSilicon, "Support for carrier selection/ switching in CA enhancement," 3GPP TSG RAN WG1 Meeting #82, Beijing, China, Aug. 24-28, 2015, 8 pages, XP051039455.

R1-156921, Huawei, HiSilicon, "Support for SRS switching among TDD Scells in CA enhancement," 3GPP TSG RAN NG1 Meeting #83, Anaheim, USA, Nov. 15-22, 2015, 7 pages, XP051039950.

R2-154344, Huawei, HiSilicon, "Support for SRS switching among TDD Scells", 3GPP TSG-RAN WG2 Meeting #91bis, Malmo, Sweden, Oct. 5-9, 2015, 5 pages, XP051004880.

* cited by examiner

BASE STATION AND SYSTEM FOR COMMUNICATION OF RRC SIGNALING AND AN SRS IN A TARGET SUBFRAME

CROSS-REFERENCE TO RELATED APPLICATIONS

This application is a continuation of U.S. application Ser. No. 17/177,981, filed on Feb. 17, 2021, which is a continuation of U.S. application Ser. No. 16/090,344, filed on Oct. 1, 2018, now U.S. Pat. No. 10,979,868, which is a national stage of International Application No. PCT/CN2016/078343, filed on Apr. 1, 2016. All of the aforementioned patent applications are hereby incorporated by reference in their entireties.

TECHNICAL FIELD

The present invention relates to the field of communications technologies, and in particular, to a method and a system for transmitting an uplink signal between a plurality of carriers, user equipment, and a base station.

BACKGROUND

In a Long Term Evolution (English full name: Long Term Evolution, LTE for short) system, channel estimation is required. Channel estimation is a process of estimating a model parameter of an assumed channel model when receiving data.

Currently, for a carrier that supports both uplink transmission and downlink transmission, it is beneficial to perform channel estimation by using sounding reference information (English full name: Sounding Reference Signal, SRS for short) and channel reciprocity.

However, user equipment (English full name: User Equipment, UE for short) generally can aggregate a larger quantity of downlink carriers than a quantity of uplink carriers. As a result, when uplink transmission resources are in shortage, some downlink carriers with downlink transmission cannot be used for uplink transmission, for example, transmission of an uplink SRS signal. Obviously, for these downlink carriers, channel reciprocity cannot be effectively utilized.

SUMMARY

Embodiments of the present invention provide a method and a system for transmitting an uplink signal between a plurality of carriers, user equipment, and a base station, so that channel reciprocity can be effectively utilized.

In view of this, a first aspect of the present invention provides a method for transmitting an uplink signal between a plurality of carriers, including:

The method for transmitting an uplink signal between a plurality of carriers means that a downlink subframe of a frequency division duplex (English full name: Frequency Division Duplex, FDD for short) or time division duplex (English full name: Time Division Duplex, TDD for short) carrier may be converted to a subframe in a specific subframe format, and may be used for uplink channel detection or channel state information reporting. The converted-to downlink subframe includes at least one uplink signal. Alternatively, an uplink subframe of the FDD or TDD carrier is converted to a subframe that includes transmission of at least one uplink signal.

Alternatively, a special subframe of the FDD or TDD carrier is converted to a subframe that includes transmission of at least one uplink signal. Therefore, the method includes:
  receiving indication signaling sent by a base station; and
  transmitting an uplink signal in a target subframe of a corresponding target carrier based on the indication signaling.

Optionally, uplink signals may be specific to some UEs that have an uplink signal transmission requirement.

A beneficial effect is: The uplink signal is transmitted in the target subframe of the target carrier based on the received indication signaling. Apparently, when the target carrier performs downlink transmission, for a larger quantity of carriers in downlink transmission, the indication signaling is used to enable a downlink subframe or an uplink subframe of the carrier to transmit the uplink signal. Apparently, in the present invention, channel reciprocity is effectively utilized.

With reference to the first aspect of the present invention, a first implementation of the first aspect of the present invention includes:
  the indication signaling is signaling that indicates carrier conversion and/or subframe conversion.

With reference to the first aspect of the present invention or the first implementation of the first aspect of the present invention, a second implementation of the first aspect of the present invention includes:
  the indication signaling includes carrier indication information and/or subframe indication information.

With reference to the second implementation of the first aspect of the present invention, a third implementation of the first aspect of the present invention includes: the indication signaling further includes at least one of bandwidth occupied by the uplink signal, a transmission mode, a transmit port, a cyclic shift, timing advance, and a power control parameter.

Optionally, the indication signaling is scrambled by using a specific cyclic redundancy code CRC.

With reference to the second implementation of the first aspect of the present invention, a fourth implementation of the first aspect of the present invention includes:
  the carrier indication information includes a converted-from carrier index and/or a converted-to carrier index, and the subframe indication information includes a converted-from subframe number and/or a converted-to subframe number.

With reference to the first aspect of the present invention, the first implementation of the first aspect of the present invention, or the second implementation of the first aspect of the present invention, a fifth implementation of the first aspect of the present invention includes: the target carrier is a converted-to carrier, and the target subframe is a converted-to subframe.

With reference to the first aspect of the present invention, the first implementation of the first aspect of the present invention, the second implementation of the first aspect of the present invention, the third implementation of the first aspect of the present invention, the fourth implementation of the first aspect of the present invention, or the fifth implementation of the first aspect of the present invention, a sixth implementation of the first aspect of the present invention includes:
  the uplink signal includes at least one of a sounding reference signal SRS, a preamble, and a Code Division Multiple Access CDMA signal.

With reference to the sixth implementation of the first aspect of the present invention, a seventh implementation of the first aspect of the present invention includes:

the SRS is a combination of a plurality of preconfigured SRS sequences, and/or a transmission mode of the SRS is a combination of a plurality of preconfigured SRS modes.

With reference to the first aspect of the present invention, the first implementation of the first aspect of the present invention, the second implementation of the first aspect of the present invention, the third implementation of the first aspect of the present invention, the fourth implementation of the first aspect of the present invention, the fifth implementation of the first aspect of the present invention, the sixth implementation of the first aspect of the present invention, or the seventh implementation of the first aspect of the present invention, an eighth implementation of the first aspect of the present invention includes:

the target subframe is used to transmit downlink control information and/or downlink data information and/or the uplink signal; and/or the target subframe is used to transmit uplink control information and/or uplink data information and/or the uplink signal; and/or the target subframe is used to transmit downlink control information and/or downlink data information and/or uplink control information, where the uplink signal includes the uplink control information.

With reference to the first aspect of the present invention, the first implementation of the first aspect of the present invention, the second implementation of the first aspect of the present invention, the third implementation of the first aspect of the present invention, the fourth implementation of the first aspect of the present invention, the fifth implementation of the first aspect of the present invention, the sixth implementation of the first aspect of the present invention, the seventh implementation of the first aspect of the present invention, or the eighth implementation of the first aspect of the present invention, a ninth implementation of the first aspect of the present invention includes:

if the target subframe is used to transmit the uplink signal and/or the uplink control information, the method further includes:

configuring a time-domain location and/or a frequency-domain location and/or an occupied symbol length of the uplink signal and/or the uplink control information.

With reference to the eighth implementation of the first aspect of the present invention or the ninth implementation of the first aspect of the present invention, a tenth implementation of the first aspect of the present invention includes:

the uplink control information is used for at least one of uplink channel detection, channel state information CSI feedback, and hybrid automatic repeat request HARQ feedback.

With reference to the first aspect of the present invention, the first implementation of the first aspect of the present invention, the second implementation of the first aspect of the present invention, the third implementation of the first aspect of the present invention, the fourth implementation of the first aspect of the present invention, the fifth implementation of the first aspect of the present invention, the sixth implementation of the first aspect of the present invention, the seventh implementation of the first aspect of the present invention, the eighth implementation of the first aspect of the present invention, the ninth implementation of the first aspect of the present invention, or the tenth implementation of the first aspect of the present invention, an eleventh implementation of the first aspect of the present invention includes:

if the target subframe includes downlink transmission and uplink transmission, there is a guard interval between the downlink transmission and the uplink transmission, and a length of the guard interval is configurable.

Optionally, there are successively the downlink control information, the downlink data information, a guard interval, and the uplink signal; or there are successively the downlink control information, the downlink data information, the guard interval, and the uplink control information; or there are successively the downlink control information, the downlink data information, the guard interval, the uplink control information, and the uplink signal.

Optionally, a length of the downlink-to-uplink guard interval GP1 may be configured.

Optionally, a length of the uplink-to-downlink guard interval GP2 may be 0.

With reference to the first aspect of the present invention, the first implementation of the first aspect of the present invention, the second implementation of the first aspect of the present invention, the third implementation of the first aspect of the present invention, the fourth implementation of the first aspect of the present invention, the fifth implementation of the first aspect of the present invention, the sixth implementation of the first aspect of the present invention, the seventh implementation of the first aspect of the present invention, the eighth implementation of the first aspect of the present invention, the ninth implementation of the first aspect of the present invention, the tenth implementation of the first aspect of the present invention, or the eleventh implementation of the first aspect of the present invention, a twelfth implementation of the first aspect of the present invention includes:

the indication signaling is notified by using self-carrier signaling or cross-carrier signaling.

With reference to the first aspect of the present invention, the first implementation of the first aspect of the present invention, the second implementation of the first aspect of the present invention, the third implementation of the first aspect of the present invention, the fourth implementation of the first aspect of the present invention, the fifth implementation of the first aspect of the present invention, the sixth implementation of the first aspect of the present invention, the seventh implementation of the first aspect of the present invention, the eighth implementation of the first aspect of the present invention, the ninth implementation of the first aspect of the present invention, the tenth implementation of the first aspect of the present invention, the eleventh implementation of the first aspect of the present invention, or the twelfth implementation of the first aspect of the present invention, a thirteenth implementation of the first aspect of the present invention includes:

the indication signaling is dynamically configured or semi-statically configured.

With reference to the thirteenth implementation of the first aspect of the present invention, a fourteenth implementation of the first aspect of the present invention includes:

that the indication signaling is dynamically configured or semi-statically configured is specifically: dynamically configuring or semi-statically configuring the indication signaling by using at least one of broadcast signaling, higher layer radio resource control RRC signaling, and physical layer signaling.

With reference to the thirteenth implementation of the first aspect of the present invention or the fourteenth implementation of the first aspect of the present invention, a fifteenth implementation of the first aspect of the present invention includes:

the semi-static configuration includes that a carrier mode and/or a subframe mode are/is semi-statically configured.

With reference to the fifteenth implementation of the first aspect of the present invention, a sixteenth implementation of the first aspect of the present invention includes:

the carrier mode and/or the subframe mode comply/complies with a preconfigured sequence design when jumping between carriers and/or subframes.

With reference to the thirteenth implementation of the first aspect of the present invention, the fourteenth implementation of the first aspect of the present invention, the fifteenth implementation of the first aspect of the present invention, or the sixteenth implementation of the first aspect of the present invention, a seventeenth implementation of the first aspect of the present invention includes:

the semi-static configuration has an applicable period that is configurable.

With reference to the thirteenth implementation of the first aspect of the present invention, the fourteenth implementation of the first aspect of the present invention, the fifteenth implementation of the first aspect of the present invention, the sixteenth implementation of the first aspect of the present invention, or the seventeenth implementation of the first aspect of the present invention, an eighteenth implementation of the first aspect of the present invention includes:

the semi-static configuration is dynamically activated or deactivated.

With reference to the fifteenth implementation of the first aspect of the present invention, the sixteenth implementation of the first aspect of the present invention, the seventeenth implementation of the first aspect of the present invention, or the eighteenth implementation of the first aspect of the present invention, a nineteenth implementation of the first aspect of the present invention includes:

the carrier mode and/or the subframe mode are/is periodic modes/a periodic mode or aperiodic modes/an aperiodic mode, and a carrier and/or a subframe in the carrier mode and/or the subframe mode are/is in a uniform mode or a non-uniform mode.

With reference to the nineteenth implementation of the first aspect of the present invention, a twentieth implementation of the first aspect of the present invention includes:

if the subframe mode is the periodic mode, the subframe in the subframe mode has a same period or different periods on different carriers.

With reference to the fifteenth implementation of the first aspect of the present invention, the sixteenth implementation of the first aspect of the present invention, the seventeenth implementation of the first aspect of the present invention, the eighteenth implementation of the first aspect of the present invention, the nineteenth implementation of the first aspect of the present invention, or the twentieth implementation of the first aspect of the present invention, a twenty-first implementation of the first aspect of the present invention includes:

the carrier mode and/or the subframe mode are/is determined by interface signaling between base stations, and the carrier mode and/or the subframe mode are/is transferred between the base stations.

A second aspect of the present invention provides a method for transmitting an uplink signal between a plurality of carriers, including:

configuring indication signaling; and sending the indication signaling to user equipment, so that the user equipment transmits an uplink signal in a target subframe of a corresponding target carrier based on the indication signaling.

With reference to the second aspect of the present invention, a first implementation of the second aspect of the present invention includes:

the indication signaling is signaling that indicates carrier conversion and/or subframe conversion.

With reference to the second aspect of the present invention or the first implementation of the second aspect of the present invention, a second implementation of the second aspect of the present invention includes:

the indication signaling includes carrier indication information and/or subframe indication information.

With reference to the second implementation of the second aspect of the present invention, a third implementation of the second aspect of the present invention includes:

the indication signaling further includes at least one of bandwidth occupied by the uplink signal, a transmission mode, a transmit port, a cyclic shift, timing advance, and a power control parameter.

With reference to the second implementation of the second aspect of the present invention, a fourth implementation of the second aspect of the present invention includes:

the carrier indication information includes a converted-from carrier index and/or a converted-to carrier index, and the subframe indication information includes a converted-from subframe number and/or a converted-to subframe number.

With reference to the second aspect of the present invention, the first implementation of the second aspect of the present invention, the second implementation of the second aspect of the present invention, the third implementation of the second aspect of the present invention, or the fourth implementation of the second aspect of the present invention, a fifth implementation of the second aspect of the present invention includes:

the sending the indication signaling to user equipment includes:

sending the indication signaling by using self-carrier signaling or cross-carrier signaling.

With reference to the second aspect of the present invention, the first implementation of the second aspect of the present invention, the second implementation of the second aspect of the present invention, the third implementation of the second aspect of the present invention, the fourth implementation of the second aspect of the present invention, or the fifth implementation of the second aspect of the present invention, a sixth implementation of the second aspect of the present invention includes:

the configuring indication signaling includes:

dynamically configuring or semi-statically configuring the indication signaling.

With reference to the sixth implementation of the second aspect of the present invention, a seventh implementation of the second aspect of the present invention includes:

the dynamically configuring or semi-statically configuring the indication signaling includes:

dynamically configuring or semi-statically configuring the indication signaling by using at least one of broadcast signaling, higher layer radio resource control RRC signaling, and physical layer signaling.

With reference to the fifth implementation of the second aspect of the present invention or the sixth implementation of the second aspect of the present invention, an eighth implementation of the second aspect of the present invention includes:

if the indication signaling is semi-statically configured, the semi-static configuration includes that a carrier mode and/or a subframe mode are/is semi-statically configured.

With reference to the eighth implementation of the second aspect of the present invention, a ninth implementation of the second aspect of the present invention includes:

the carrier mode and/or the subframe mode comply/complies with a preconfigured sequence design when jumping between carriers and/or subframes.

With reference to the sixth implementation of the second aspect of the present invention, the seventh implementation of the second aspect of the present invention, the eighth implementation of the second aspect of the present invention, or the ninth implementation of the second aspect of the present invention, a tenth implementation of the second aspect of the present invention includes:

the semi-static configuration has an applicable period that is configurable.

With reference to the sixth implementation of the second aspect of the present invention, the seventh implementation of the second aspect of the present invention, the eighth implementation of the second aspect of the present invention, the ninth implementation of the second aspect of the present invention, or the tenth implementation of the second aspect of the present invention, an eleventh implementation of the second aspect of the present invention includes:

the semi-static configuration is dynamically activated or deactivated.

With reference to the eighth implementation of the second aspect of the present invention, the ninth implementation of the second aspect of the present invention, the tenth implementation of the second aspect of the present invention, or the eleventh implementation of the second aspect of the present invention, a twelfth implementation of the second aspect of the present invention includes:

the carrier mode and/or the subframe mode are/is periodic modes/a periodic mode or aperiodic modes/an aperiodic mode, and a carrier and/or a subframe in the carrier mode and/or the subframe mode are/is in a uniform mode or a non-uniform mode.

With reference to the twelfth implementation of the second aspect of the present invention, a thirteenth implementation of the second aspect of the present invention includes:

if the subframe mode is the periodic mode, the subframe in the subframe mode has a same period or different periods on different carriers.

A third aspect of the present invention provides user equipment UE, including:

a receiving module, configured to receive indication signaling sent by a base station; and a transmission module, configured to transmit an uplink signal in a target subframe of a corresponding target carrier based on the indication signaling.

A beneficial effect is: The uplink signal is transmitted in the target subframe of the target carrier based on the obtained indication signaling. Apparently, when the target carrier performs downlink transmission, for a larger quantity of carriers in downlink transmission, the indication signaling is used to enable a downlink subframe or an uplink subframe of the carrier to transmit the uplink signal. Apparently, in the present invention, channel reciprocity is effectively utilized.

With reference to the third aspect of the present invention, a first implementation of the third aspect of the present invention includes:

the indication signaling is signaling that indicates carrier conversion and/or subframe conversion.

With reference to the third aspect of the present invention or the first implementation of the third aspect of the present invention, a second implementation of the third aspect of the present invention includes:

the indication signaling includes carrier indication information and/or subframe indication information.

With reference to the second implementation of the third aspect of the present invention, a third implementation of the third aspect of the present invention includes:

the indication signaling further includes at least one of bandwidth occupied by the uplink signal, a transmission mode, a transmit port, a cyclic shift, timing advance, and a power control parameter.

Optionally, the indication signaling is scrambled by using a specific cyclic redundancy code CRC.

With reference to the second implementation of the third aspect of the present invention, a fourth implementation of the third aspect of the present invention includes:

the carrier indication information includes a converted-from carrier index and/or a converted-to carrier index, and the subframe indication information includes a converted-from subframe number and/or a converted-to subframe number.

With reference to the third aspect of the present invention, the first implementation of the third aspect of the present invention, or the second implementation of the third aspect of the present invention, a fifth implementation of the third aspect of the present invention includes:

the target carrier is a converted-to carrier, and the target subframe is a converted-to subframe.

With reference to the third aspect of the present invention, the first implementation of the third aspect of the present invention, the second implementation of the third aspect of the present invention, the third implementation of the third aspect of the present invention, the fourth implementation of the third aspect of the present invention, or the fifth implementation of the third aspect of the present invention, a sixth implementation of the third aspect of the present invention includes:

the uplink signal includes at least one of a sounding reference signal SRS, a preamble, and a Code Division Multiple Access CDMA signal.

With reference to the sixth implementation of the third aspect of the present invention, a seventh implementation of the third aspect of the present invention includes:

the SRS is a combination of a plurality of preconfigured SRS sequences, and/or a transmission mode of the SRS is a combination of a plurality of preconfigured SRS modes.

With reference to the third aspect of the present invention, the first implementation of the third aspect of the present invention, the second implementation of the third aspect of the present invention, the third implementation of the third aspect of the present invention, the fourth implementation of the third aspect of the present invention, the fifth implementation of the third aspect of the present invention, the sixth implementation of the third aspect of the present invention, or the seventh implementation of the third aspect of the present invention, an eighth implementation of the third aspect of the present invention includes:

the transmission module is specifically configured to:
transmit, in the target subframe of the corresponding target carrier based on the indication signaling, downlink control information and/or downlink data information and/or the uplink signal; and/or transmit uplink control information and/or uplink data information and/or the uplink signal; and/or transmit downlink control information and/or downlink data information and/or uplink control information, where the uplink signal includes the uplink control information.

With reference to the third aspect of the present invention, the first implementation of the third aspect of the present invention, the second implementation of the third aspect of the present invention, the third implementation of the third aspect of the present invention, the fourth implementation of the third aspect of the present invention, the fifth implementation of the third aspect of the present invention, the sixth implementation of the third aspect of the present invention, the seventh implementation of the third aspect of the present invention, or the eighth implementation of the third aspect of the present invention, a ninth implementation of the third aspect of the present invention includes:
  if the transmission module transmits the uplink signal and/or the uplink control information, the UE further includes:
  a configuration module, configured to configure a time-domain location or a frequency-domain location and/or an occupied symbol length of the uplink signal and/or the uplink control information.

With reference to the eighth implementation of the third aspect of the present invention or the ninth implementation of the third aspect of the present invention, a tenth implementation of the third aspect of the present invention includes:
  the uplink control information is used for at least one of uplink channel detection, channel state information CSI feedback, and hybrid automatic repeat request HARQ feedback.

With reference to the third aspect of the present invention, the first implementation of the third aspect of the present invention, the second implementation of the third aspect of the present invention, the third implementation of the third aspect of the present invention, the fourth implementation of the third aspect of the present invention, the fifth implementation of the third aspect of the present invention, the sixth implementation of the third aspect of the present invention, the seventh implementation of the third aspect of the present invention, the eighth implementation of the third aspect of the present invention, the ninth implementation of the third aspect of the present invention, or the tenth implementation of the third aspect of the present invention, an eleventh implementation of the third aspect of the present invention includes:
  if the target subframe includes downlink transmission and uplink transmission, there is a guard interval between the downlink transmission and the uplink transmission, and a length of the guard interval is configurable.

With reference to the third aspect of the present invention, the first implementation of the third aspect of the present invention, the second implementation of the third aspect of the present invention, the third implementation of the third aspect of the present invention, the fourth implementation of the third aspect of the present invention, the fifth implementation of the third aspect of the present invention, the sixth implementation of the third aspect of the present invention, the seventh implementation of the third aspect of the present invention, the eighth implementation of the third aspect of the present invention, the ninth implementation of the third aspect of the present invention, the tenth implementation of the third aspect of the present invention, or the eleventh implementation of the third aspect of the present invention, a twelfth implementation of the third aspect of the present invention includes:
  the indication signaling is notified by using self-carrier signaling or cross-carrier signaling.

With reference to the third aspect of the present invention, the first implementation of the third aspect of the present invention, the second implementation of the third aspect of the present invention, the third implementation of the third aspect of the present invention, the fourth implementation of the third aspect of the present invention, the fifth implementation of the third aspect of the present invention, the sixth implementation of the third aspect of the present invention, the seventh implementation of the third aspect of the present invention, the eighth implementation of the third aspect of the present invention, the ninth implementation of the third aspect of the present invention, the tenth implementation of the third aspect of the present invention, the eleventh implementation of the third aspect of the present invention, or the twelfth implementation of the third aspect of the present invention, a thirteenth implementation of the third aspect of the present invention includes:
  the indication signaling is dynamically configured or semi-statically configured.

With reference to the thirteenth implementation of the third aspect of the present invention, a fourteenth implementation of the third aspect of the present invention includes:
  that the indication signaling is dynamically configured or semi-statically configured is specifically: dynamically configuring or semi-statically configuring the indication signaling by using at least one of broadcast signaling, higher layer radio resource control RRC signaling, and physical layer signaling.

With reference to the thirteenth implementation of the third aspect of the present invention or the fourteenth implementation of the third aspect of the present invention, a fifteenth implementation of the third aspect of the present invention includes:
  the semi-static configuration includes that a carrier mode and/or a subframe mode are/is semi-statically configured.

With reference to the fifteenth implementation of the third aspect of the present invention, a sixteenth implementation of the third aspect of the present invention includes:
  the carrier mode and/or the subframe mode comply/complies with a preconfigured sequence design when jumping between carriers and/or subframes.

With reference to the thirteenth implementation of the third aspect of the present invention, the fourteenth implementation of the third aspect of the present invention, the fifteenth implementation of the third aspect of the present invention, or the sixteenth implementation of the third aspect of the present invention, a seventeenth implementation of the third aspect of the present invention includes:
  the semi-static configuration has an applicable period that is configurable.

With reference to the thirteenth implementation of the third aspect of the present invention, the fourteenth implementation of the third aspect of the present invention, the fifteenth implementation of the third aspect of the present invention, the sixteenth implementation of the third aspect of the present invention, or the seventeenth implementation of the third aspect of the present invention, an eighteenth implementation of the third aspect of the present invention includes:

the semi-static configuration is dynamically activated or deactivated.

With reference to the fifteenth implementation of the third aspect of the present invention, the sixteenth implementation of the third aspect of the present invention, the seventeenth implementation of the third aspect of the present invention, or the eighteenth implementation of the third aspect of the present invention, a nineteenth implementation of the third aspect of the present invention includes:

the carrier mode and/or the subframe mode are/is periodic modes/a periodic mode or aperiodic modes/an aperiodic mode, and a carrier and/or a subframe in the carrier mode and/or the subframe mode are/is in a uniform mode or a non-uniform mode.

With reference to the nineteenth implementation of the third aspect of the present invention, a twentieth implementation of the third aspect of the present invention includes:

if the subframe mode is the periodic mode, the subframe in the subframe mode has a same period or different periods on different carriers.

With reference to the fifteenth implementation of the third aspect of the present invention, the sixteenth implementation of the third aspect of the present invention, the seventeenth implementation of the third aspect of the present invention, the eighteenth implementation of the third aspect of the present invention, the nineteenth implementation of the third aspect of the present invention, or the twentieth implementation of the third aspect of the present invention, a twenty-first implementation of the third aspect of the present invention includes:

the carrier mode and/or the subframe mode are/is determined by interface signaling between base stations, and the carrier mode and/or the subframe mode are/is transferred between the base stations.

A fourth aspect of the present invention provides a base station, including:

a configuration module, configured to configure indication signaling; and a sending module, configured to send the indication signaling to user equipment, so that the user equipment transmits an uplink signal in a target subframe of a corresponding target carrier based on the indication signaling.

With reference to the fourth aspect of the present invention, a first implementation of the fourth aspect of the present invention includes:

the indication signaling is signaling that indicates carrier conversion and/or subframe conversion.

With reference to the fourth aspect of the present invention or the first implementation of the fourth aspect of the present invention, a second implementation of the fourth aspect of the present invention includes:

the indication signaling includes carrier indication information and/or subframe indication information.

With reference to the second implementation of the fourth aspect of the present invention, a third implementation of the fourth aspect of the present invention includes:

the indication signaling further includes at least one of bandwidth occupied by the uplink signal, a transmission mode, a transmit port, a cyclic shift, timing advance, and a power control parameter.

With reference to the second implementation of the fourth aspect of the present invention, a fourth implementation of the fourth aspect of the present invention includes:

the carrier indication information includes a converted-from carrier index and/or a converted-to carrier index, and the subframe indication information includes a converted-from subframe number and/or a converted-to subframe number.

With reference to the fourth aspect of the present invention, the first implementation of the fourth aspect of the present invention, the second implementation of the fourth aspect of the present invention, the third implementation of the fourth aspect of the present invention, or the fourth implementation of the fourth aspect of the present invention, a fifth implementation of the fourth aspect of the present invention includes:

the sending module is specifically configured to send the indication signaling by using self-carrier signaling or cross-carrier signaling.

With reference to the fourth aspect of the present invention, the first implementation of the fourth aspect of the present invention, the second implementation of the fourth aspect of the present invention, the third implementation of the fourth aspect of the present invention, the fourth implementation of the fourth aspect of the present invention, or the fifth implementation of the fourth aspect of the present invention, a sixth implementation of the fourth aspect of the present invention includes:

the configuration module is specifically configured to dynamically configure or semi-statically configure the indication signaling.

With reference to the sixth implementation of the fourth aspect of the present invention, a seventh implementation of the fourth aspect of the present invention includes:

the configuration module is specifically configured to dynamically configure or semi-statically configure the indication signaling by using at least one of broadcast signaling, higher layer radio resource control RRC signaling, and physical layer signaling.

With reference to the fifth implementation of the fourth aspect of the present invention or the sixth implementation of the fourth aspect of the present invention, an eighth implementation of the fourth aspect of the present invention includes:

if the indication signaling is semi-statically configured, the semi-static configuration includes that a carrier mode and/or a subframe mode are/is semi-statically configured.

With reference to the eighth implementation of the fourth aspect of the present invention, a ninth implementation of the fourth aspect of the present invention includes:

the carrier mode and/or the subframe mode comply/complies with a preconfigured sequence design when jumping between carriers and/or subframes.

With reference to the sixth implementation of the fourth aspect of the present invention, the seventh implementation of the fourth aspect of the present invention, the eighth implementation of the fourth aspect of the present invention, or the ninth implementation of the fourth aspect of the present invention, a tenth implementation of the fourth aspect of the present invention includes:

the semi-static configuration has an applicable period that is configurable.

With reference to the sixth implementation of the fourth aspect of the present invention, the seventh implementation of the fourth aspect of the present invention, the eighth implementation of the fourth aspect of the present invention, the ninth implementation of the fourth aspect of the present invention, or the tenth implementation of the fourth aspect of the present invention, an eleventh implementation of the fourth aspect of the present invention includes:

the semi-static configuration is dynamically activated or deactivated.

With reference to the eighth implementation of the fourth aspect of the present invention, the ninth implementation of the fourth aspect of the present invention, the tenth implementation of the fourth aspect of the present invention, or the eleventh implementation of the fourth aspect of the present invention, a twelfth implementation of the fourth aspect of the present invention includes:

the carrier mode and/or the subframe mode are/is periodic modes/a periodic mode or aperiodic modes/an aperiodic mode, and a carrier and/or a subframe in the carrier mode and/or the subframe mode are/is in a uniform mode or a non-uniform mode.

With reference to the twelfth implementation of the fourth aspect of the present invention, a thirteenth implementation of the fourth aspect of the present invention includes:

if the subframe mode is the periodic mode, the subframe in the subframe mode has a same period or different periods on different carriers.

A fifth aspect of the present invention further provides a system for transmitting an uplink signal between a plurality of carriers, including the user equipment according to the third aspect of the present invention and the base station according to the fourth aspect of the present invention.

According to the technical solutions provided in the embodiments of the present invention, the uplink signal is transmitted in the target subframe of the target carrier based on the received indication signaling. Apparently, when the target carrier performs downlink transmission, for a larger quantity of carriers in downlink transmission, the indication signaling is used to enable a downlink subframe or an uplink subframe of the carrier to transmit the uplink signal. Apparently, in the present invention, channel reciprocity is effectively utilized.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons skilled in the art based on the embodiments of the present invention without creative efforts shall fall within the protection scope of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. In addition, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Figure 1:
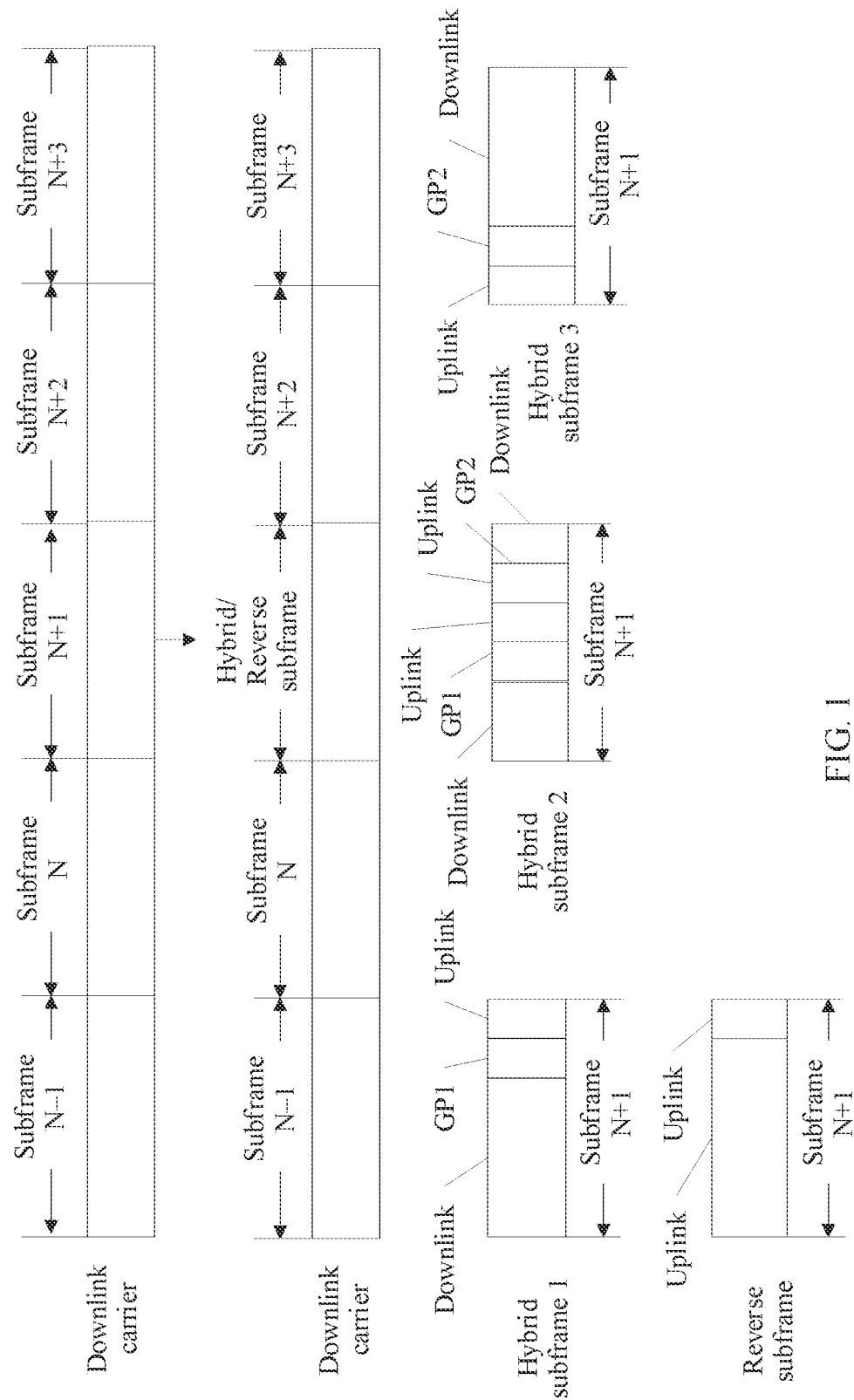
FIG. 1 is a schematic diagram of a customized hybrid subframe and a reverse subframe according to an embodiment of the present invention.

In the present invention, indication signaling is used for indication, so that a downlink subframe on a carrier has two new subframe definitions: 1. a hybrid subframe, and 2. a reverse subframe. The hybrid subframe means: 1. converting a last downlink symbol of the downlink subframe to an uplink symbol for uplink signal transmission, such as SRS transmission, uplink channel detection, channel state information (English full name: Channel State Information, CSI for short) feedback, or hybrid automatic repeat request (English full name: Hybrid Automatic Repeat Request, HARQ for short) feedback, where in the hybrid subframe, a guard interval GP1 is used for downlink-to-uplink conversion, and a guard interval GP2 is used for uplink-to-downlink conversion; or 2. a location and a length of an uplink symbol are flexible, that is, are not limited to a last symbol, and a longer guard interval is used for downlink-to-uplink conversion. The reverse subframe means that an entire downlink subframe is converted to an uplink subframe. To facilitate understanding of definitions of the hybrid subframe and the reverse subframe, referring to FIG. 1, FIG. 1 is a schematic diagram of a customized hybrid subframe and a reverse subframe. Three hybrid subframes and one reverse subframe are used as an example for description. A guard interval GP1 in FIG. 1 is used for downlink-to-uplink conversion, and a length is configurable. A GP2 is used for uplink-to-downlink conversion, and a length is configurable, for example, may be 0. In a reverse subframe shown in FIG. 1, a first uplink (left side) transmission may be a physical uplink shared channel (English full name: Physical Uplink Shared Channel, PUSCH for short), and a second uplink (right side) transmission is an SRS.

To facilitate understanding of the technical solutions of the present invention, the following describes the method for transmitting an uplink signal between a plurality of carriers in the present invention by using specific embodiments.

Figure 2:
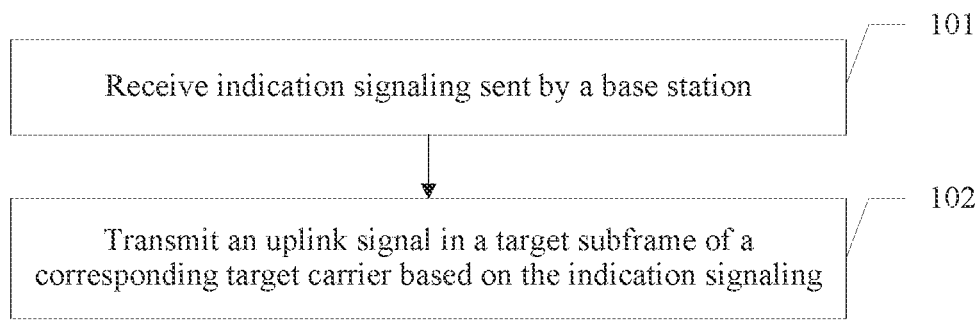
FIG. 2 is a schematic diagram of an embodiment of a method for transmitting an uplink signal between a plurality of carriers according to an embodiment of the present invention.

Referring to FIG. 2, an embodiment of a method for transmitting an uplink signal between a plurality of carriers according to an embodiment of the present invention includes the following steps.

101. Receive indication signaling sent by a base station.

In this embodiment, the indication signaling may be signaling that indicates carrier conversion and/or subframe conversion.

Optionally, the indication signaling includes carrier indication information and/or sub frame indication information.

Optionally, the indication signaling further includes at least one of bandwidth occupied by the uplink signal, a transmission mode, a transmit port, a cyclic shift, timing advance, and a power control parameter.

Optionally, the carrier indication information includes a converted-from carrier index and/or a converted-to carrier index, and the subframe indication information includes a converted-from subframe number and/or a converted-to subframe number.

102. Transmit an uplink signal in a target subframe of a corresponding target carrier based on the indication signaling.

Apparently, the target carrier and the target subframe of the target carrier are determined based on the indication signaling, and the uplink signal is transmitted in the target subframe of the target carrier.

It should be noted that if the carrier indication information includes the converted-from carrier index and/or the converted-to carrier index, and the subframe indication information includes the converted-from subframe number and/or the converted-to subframe number, the target carrier is a converted-to carrier, and the target subframe is a converted-to subframe.

It may be understood that, in addition to transmitting the uplink signal, the target subframe of the target carrier may further transmit the following information:

Optionally, the target subframe further transmits downlink control information and downlink data information, or the target subframe further transmits uplink control information and uplink data information.

Specifically, the method further includes: transmitting, in the target subframe of the corresponding target carrier based on the indication signaling, at least one of the downlink control information, the downlink data information, the uplink control information, and the uplink data information.

Optionally, if the uplink signal includes the uplink control information, step 102 is specifically: Transmit, in the target subframe of the corresponding target carrier based on the indication signaling, the downlink control information and/or the downlink data information and/or the uplink control information.

Optionally, there are successively the downlink control information, the downlink data information, a guard interval, and the uplink signal; or there are successively the downlink control information, the downlink data information, the guard interval, and the uplink control information; or there are successively the downlink control information, the downlink data information, the guard interval, the uplink control information, and the uplink signal.

Optionally, there are successively the uplink control information, the uplink data information, the guard interval, and the uplink signal; or there are successively the uplink control information, the uplink data information, the guard interval, the uplink signal, and the uplink data information.

In short, transmitting the uplink signal in the target subframe may be: 1. The uplink signal does not include the uplink control information, and the uplink signal and other information are transmitted in the target subframe; 2. The uplink signal includes the uplink control information, and the uplink control information and other information are transmitted in the target subframe. Apparently, there are two special cases: 1. Only the uplink signal is transmitted in the target subframe; 2. Only the uplink control information is transmitted in the target subframe.

It should be noted that if the target subframe is used for only uplink transmission, it indicates that the target subframe at this time may be equivalent to the foregoing reverse subframe. If the target subframe is used for both uplink transmission and downlink transmission, it indicates that the target subframe at this time is equivalent to the foregoing hybrid subframe.

Further, if the target subframe further transmits the uplink control information, this embodiment of the present invention may further include:

configuring a time-domain location or a frequency-domain location and/or an occupied symbol length of the uplink signal and/or the uplink control information.

It should be noted that the target subframe includes downlink transmission and uplink transmission, there is a guard interval GP between the downlink transmission and the uplink transmission, and a length of the guard interval is configurable.

Optionally, the uplink signal is used for uplink channel detection, and the uplink control information is used for at least one of uplink channel detection, channel state information CSI feedback, and hybrid automatic repeat request (English full name: Hybrid Automatic Repeat Request, HARQ for short) feedback.

Optionally, the uplink signal includes at least one of a sounding reference signal SRS, a preamble, and a Code Division Multiple Access (English full name: Code Division Multiple Access, CDMA for short) signal.

Optionally, the SRS is a combination of a plurality of preconfigured SRS sequences, and a transmission mode of the SRS is a combination of a plurality of preconfigured SRS modes, to ensure that a full bandwidth detection capability exceeds a detection threshold.

Optionally, the indication signaling is notified by using self-carrier signaling or cross-carrier signaling.

It may be understood that configuration may be notified by using the cross-carrier signaling, that is, converted-to subframes of all carriers are notified on a primary carrier or a secondary carrier. That is, when a plurality of carriers have a common converted-to subframe mode, only one common converted-to subframe mode needs to be notified by using signaling and a related carrier set is carried simultaneously. Alternatively, a specific mode used when jumping is performed between the plurality of carriers may be met or a specific jump sequence may be complied with.

Optionally, the indication signaling is dynamically configured or semi-statically configured.

Optionally, that the indication signaling is dynamically configured or semi-statically configured is specifically: dynamically configuring or semi-statically configuring the indication signaling by using at least one of broadcast signaling, higher layer radio resource control (English full name: Radio Resource Control, RRC for short) signaling, and physical layer signaling.

Optionally, the semi-static configuration includes that a carrier mode and/or a subframe mode are/is semi-statically configured.

Optionally, the carrier mode and/or the subframe mode comply/complies with a preconfigured sequence design when jumping between carriers and/or subframes.

Optionally, the semi-static configuration has an applicable period that is configurable.

Optionally, the semi-static configuration is dynamically activated or deactivated.

Optionally, the carrier mode and/or the subframe mode are/is periodic modes/a periodic mode or aperiodic modes/an aperiodic mode, and a carrier and/or a subframe in the carrier mode and/or the subframe mode are/is in a uniform mode or a non-uniform mode.

Figure 3:
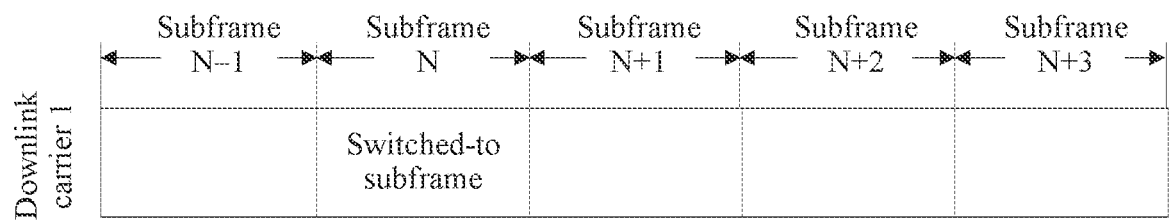
FIG. 3 is a schematic diagram of a uniform mode according to an embodiment of the present invention.
Figure 3:
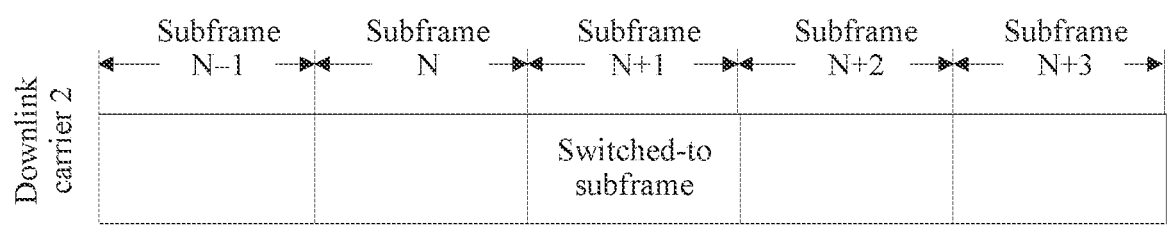
Figure 3:
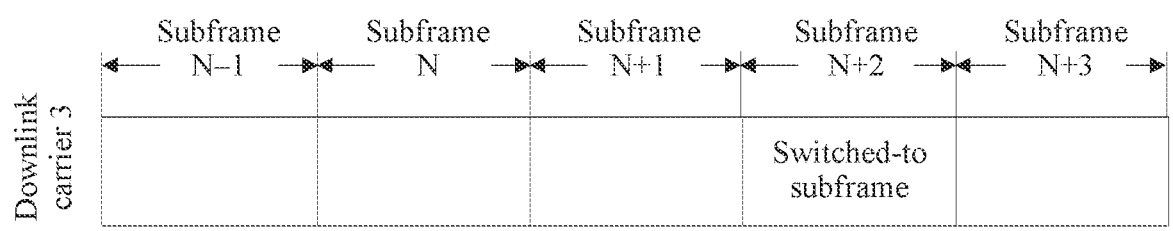
Figure 4:
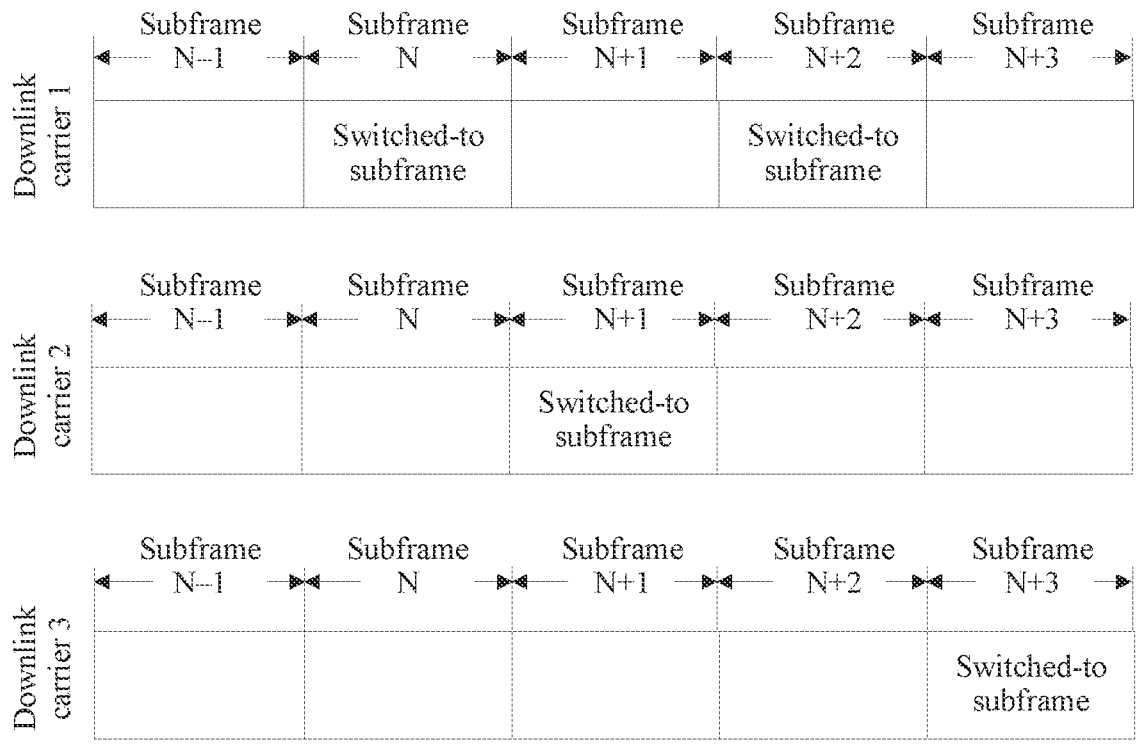
FIG. 4 is a schematic diagram of a non-uniform mode according to an embodiment of the present invention.

Refer to FIG. 3 for a specific accompanying drawing of the uniform mode, refer to FIG. 4 for a specific accompanying drawing of the non-uniform mode, and a subframe in FIG. 3 and FIG. 4 is represented by using a switched-to subframe.

Optionally, if the subframe mode is the periodic mode, the subframe in the subframe mode has a same period or different periods on different carriers.

Optionally, the carrier mode and/or the subframe mode are/is determined by interface signaling between base stations, and the carrier mode and/or the subframe mode are/is transferred between the base stations.

It should be noted that the carrier mode and/or the subframe mode need/needs to be aligned between the base stations, to cope with interference from the base station. An interface between the base stations may be an X2 interface.

In this embodiment, the uplink signal is transmitted in the target subframe of the target carrier based on the obtained indication signaling. Apparently, when the target carrier performs downlink transmission, for a larger quantity of carriers in downlink transmission, the indication signaling is used to enable a downlink subframe or an uplink subframe of the carrier to transmit the uplink signal. Apparently, in the present invention, channel reciprocity is effectively utilized.

The foregoing has described the method for transmitting an uplink signal between a plurality of carriers in the present invention from a user equipment side. The following describes the method for transmitting an uplink signal between a plurality of carriers in the present invention from a base station side.

Figure 5:
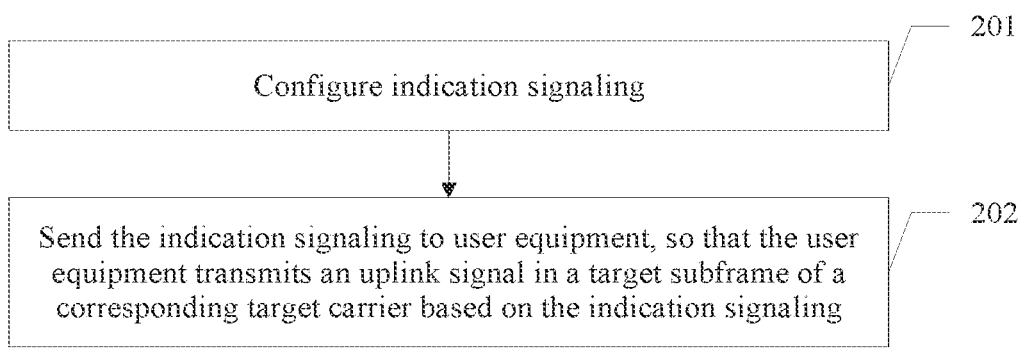
FIG. 5 is a schematic diagram of another embodiment of a method for transmitting an uplink signal between a plurality of carriers according to an embodiment of the present invention.

Referring to FIG. 5, another embodiment of a method for transmitting an uplink signal between a plurality of carriers according to an embodiment of the present invention includes the following steps.

201. Configure indication signaling.

In this embodiment, optionally, the indication signaling is signaling that indicates carrier conversion and/or subframe conversion.

Optionally, the indication signaling includes carrier indication information and/or subframe indication information.

Optionally, the indication signaling further includes at least one of bandwidth occupied by the uplink signal, a transmission mode, a transmit port, a cyclic shift, timing advance, and a power control parameter.

Optionally, the carrier indication information includes a converted-from carrier index and/or a converted-to carrier index, and the subframe indication information includes a converted-from subframe number and/or a converted-to subframe number.

Optionally, configuring the indication signaling includes: dynamically configuring or semi-statically configuring the indication signaling.

Specifically, the indication signaling is dynamically configured or semi-statically configured by using at least one of broadcast signaling, higher layer radio resource control RRC signaling, and physical layer signaling.

Optionally, if the indication signaling is semi-statically configured, the semi-static configuration includes that a carrier mode and/or a subframe mode are/is semi-statically configured.

Optionally, the carrier mode and/or the subframe mode comply/complies with a preconfigured sequence design when jumping between carriers and/or subframes.

Optionally, the semi-static configuration has an applicable period that is configurable, and the semi-static configuration is dynamically activated or deactivated.

Optionally, the carrier mode and/or the subframe mode are/is periodic modes/a periodic mode or aperiodic modes/an aperiodic mode, and a carrier and/or a subframe in the carrier mode and/or the subframe mode are/is in a uniform mode or a non-uniform mode.

Optionally, if the subframe mode is the periodic mode, the subframe in the subframe mode has a same period or different periods on different carriers.

202. Send the indication signaling to user equipment, so that the user equipment transmits an uplink signal in a target subframe of a corresponding target carrier based on the indication signaling.

In this embodiment, optionally, sending the indication signaling to the user equipment includes:
sending the indication signaling by using self-carrier signaling or cross-carrier signaling.

In this embodiment, the uplink signal is transmitted in the target subframe of the target carrier based on the obtained indication signaling. Apparently, when the target carrier performs downlink transmission, for a larger quantity of carriers in downlink transmission, the indication signaling is used to enable a downlink subframe or an uplink subframe of the carrier to transmit the uplink signal. Apparently, in the present invention, channel reciprocity is effectively utilized.

Figure 6:
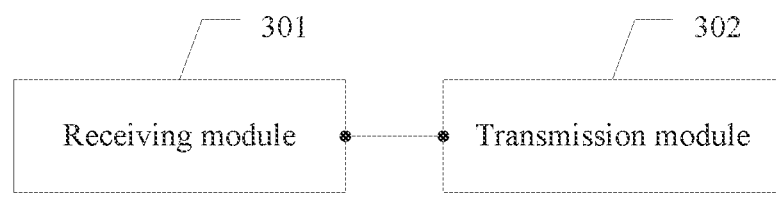
FIG. 6 is a schematic diagram of an embodiment of user equipment UE according to an embodiment of the present invention.

Referring to FIG. 6, an embodiment of user equipment UE according to an embodiment of the present invention includes:
a receiving module 301, configured to receive indication signaling sent by a base station; and
a transmission module 302, configured to transmit an uplink signal in a target subframe of a corresponding target carrier based on the indication signaling.

Optionally, the indication information is signaling that indicates carrier conversion and/or subframe conversion.

Optionally, the indication signaling further includes at least one of bandwidth occupied by the uplink signal, a transmission mode, a transmit port, a cyclic shift, timing advance, and a power control parameter. The indication signaling is scrambled by using a specific cyclic redundancy code CRC.

Optionally, carrier indication information includes a converted-from carrier index and/or a converted-to carrier index, and subframe indication information includes a converted-from subframe number and/or a converted-to subframe number.

Apparently, the target carrier and the target subframe of the target carrier are determined based on the indication signaling, and the uplink signal is transmitted in the target subframe of the target carrier.

It should be noted that if the carrier indication information includes the converted-from carrier index and/or the converted-to carrier index, and the subframe indication information includes the converted-from subframe number and/ or the converted-to subframe number, the target carrier is a converted-to carrier, and the target subframe is a converted-to subframe.

It may be understood that, in addition to transmitting the uplink signal, the target subframe of the target carrier may further transmit the following information:

Optionally, the target subframe further transmits downlink control information and downlink data information, or the target subframe further transmits uplink control information and uplink data information.

Specifically, the transmission module 302 is further configured to transmit, in the target subframe of the corresponding target carrier based on the indication signaling, at least one of the downlink control information, the downlink data information, the uplink control information, and the uplink data information.

Optionally, if the uplink signal includes the uplink control information, the transmission module 302 is specifically configured to transmit, in the target subframe of the corresponding target carrier based on the indication signaling, the downlink control information and/or the downlink data information and/or the uplink control information.

In short, transmitting the uplink signal in the target subframe may be: 1. The uplink signal does not include the uplink control information, and the uplink signal and other information are transmitted in the target subframe; 2. The uplink signal includes the uplink control information, and the uplink control information and other information are transmitted in the target subframe. Apparently, there are two special cases: 1. Only the uplink signal is transmitted in the target subframe; 2. Only the uplink control information is transmitted in the target subframe.

It should be noted that if the target subframe is used for only uplink transmission, it indicates that the target subframe at this time may be equivalent to the foregoing reverse subframe. If the target subframe is used for both uplink transmission and downlink transmission, it indicates that the target subframe at this time is equivalent to the foregoing hybrid subframe.

Further, if the target subframe further transmits the uplink control information, This embodiment may further include:
a configuration module, configured to configure a time-domain location or a frequency-domain location and/or an occupied symbol length of the uplink signal and/or the uplink control information.

It should be noted that the target subframe includes downlink transmission and uplink transmission, there is a guard interval GP between the downlink transmission and the uplink transmission, and a length of the guard interval is configurable.

Optionally, the uplink signal is used for uplink channel detection, and the uplink control information is used for at least one of uplink channel detection, channel state information CSI feedback, and hybrid automatic repeat request HARQ feedback.

Optionally, the uplink signal includes at least one of a sounding reference signal SRS, a preamble, and a Code Division Multiple Access CDMA signal.

Optionally, the SRS is a combination of a plurality of preconfigured SRS sequences, and a transmission mode of the SRS is a combination of a plurality of preconfigured SRS modes, to ensure that a full bandwidth detection capability exceeds a detection threshold.

Optionally, the indication signaling is notified by using self-carrier signaling or cross-carrier signaling.

It may be understood that configuration may be notified by using the cross-carrier signaling, that is, converted-to subframes of all carriers are notified on a primary carrier or a secondary carrier. That is, when a plurality of carriers have a common converted-to subframe mode, only one common converted-to subframe mode needs to be notified by using signaling and a related carrier set is carried simultaneously. Alternatively, a specific mode used when jumping is performed between the plurality of carriers may be met or a specific jump sequence may be complied with.

Optionally, the indication signaling is dynamically configured or semi-statically configured.

Optionally, that the indication signaling is dynamically configured or semi-statically configured is specifically: dynamically configuring or semi-statically configuring the indication signaling by using at least one of broadcast signaling, higher layer radio resource control RRC signaling, and physical layer signaling.

Optionally, the semi-static configuration includes that a carrier mode and/or a subframe mode are/is semi-statically configured.

Optionally, the carrier mode and/or the subframe mode comply/complies with a preconfigured sequence design when jumping between carriers and/or subframes.

Optionally, the semi-static configuration has an applicable period that is configurable.

Optionally, the semi-static configuration is dynamically activated or deactivated.

Optionally, the carrier mode and/or the subframe mode are/is periodic modes/a periodic mode or aperiodic modes/an aperiodic mode, and a carrier and/or a subframe in the carrier mode and/or the subframe mode are/is in a uniform mode or a non-uniform mode.

Optionally, if the subframe mode is the periodic mode, the subframe in the subframe mode has a same period or different periods on different carriers.

Optionally, the carrier mode and/or the subframe mode are/is determined by interface signaling between base stations, and the carrier mode and/or the subframe mode are/is transferred between the base stations.

It should be noted that the carrier mode and/or the subframe mode need/needs to be aligned between the base stations, to cope with interference from the base station. An interface between the base stations may be an X2 interface.

In this embodiment, the uplink signal is transmitted in the target subframe of the target carrier based on the received indication signaling. Apparently, when the target carrier performs downlink transmission, for a larger quantity of carriers in downlink transmission, the indication signaling is used to enable a downlink subframe or an uplink subframe of the carrier to transmit the uplink signal. Apparently, in the present invention, channel reciprocity is effectively utilized.

Figure 7:
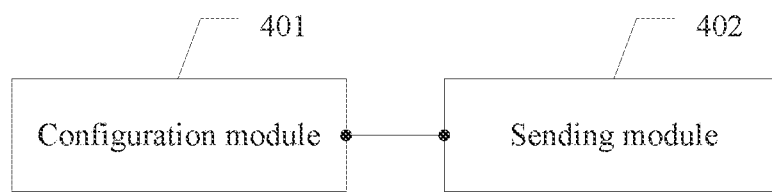
FIG. 7 is a schematic diagram of an embodiment of a base station according to an embodiment of the present invention.

Referring to FIG. 7, an embodiment of a base station according to an embodiment of the present invention includes:
a configuration module 401, configured to configure indication signaling; and
a sending module 402, configured to send the indication signaling to user equipment, so that the user equipment transmits an uplink signal in a target subframe of a corresponding target carrier based on the indication signaling.

Optionally, the indication signaling is signaling that indicates carrier conversion and/or subframe conversion.

Optionally, the indication signaling includes carrier indication information and/or subframe indication information.

Optionally, the indication signaling further includes at least one of bandwidth occupied by the uplink signal, a transmission mode, a transmit port, a cyclic shift, timing advance, and a power control parameter.

Optionally, the carrier indication information includes a converted-from carrier index and/or a converted-to carrier index, and the subframe indication information includes a converted-from subframe number and/or a converted-to subframe number.

Optionally, the sending module 402 is specifically configured to send the indication signaling by using self-carrier signaling or cross-carrier signaling.

Optionally, the configuration module 401 is specifically configured to dynamically configure or semi-statically configure the indication signaling.

Optionally, the configuration module 401 is specifically configured to dynamically configure or semi-statically configure the indication signaling by using at least one of broadcast signaling, higher layer radio resource control RRC signaling, and physical layer signaling.

Optionally, if the indication signaling is semi-statically configured, the semi-static configuration includes that a carrier mode and/or a subframe mode are/is semi-statically configured.

Optionally, the carrier mode and/or the subframe mode comply/complies with a preconfigured sequence design when jumping between carriers and/or subframes.

Optionally, the semi-static configuration has an applicable period that is configurable, and the semi-static configuration is dynamically activated or deactivated.

Optionally, the carrier mode and/or the subframe mode are/is periodic modes/a periodic mode or aperiodic modes/an aperiodic mode, and a carrier and/or a subframe in the carrier mode and/or the subframe mode are/is in a uniform mode or a non-uniform mode.

Optionally, if the subframe mode is the periodic mode, the subframe in the subframe mode has a same period or different periods on different carriers.

In this embodiment, the uplink signal is transmitted in the target subframe of the target carrier based on the received indication signaling. Apparently, when the target carrier performs downlink transmission, for a larger quantity of carriers in downlink transmission, the indication signaling is used to enable a downlink subframe or an uplink subframe of the carrier to transmit the uplink signal. Apparently, in the present invention, channel reciprocity is effectively utilized.

Figure 8:
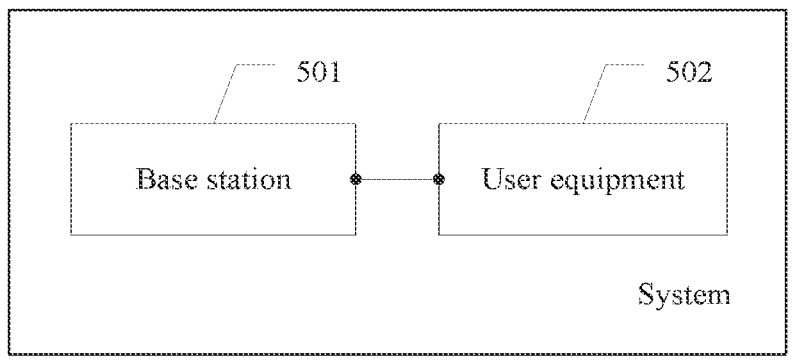
FIG. 8 is a schematic diagram of an embodiment of a system according to an embodiment of the present invention.

An embodiment of the present invention further provides a system for transmitting an uplink signal between a plurality of carriers. Referring to FIG. 8, an embodiment of the system according to this embodiment of the present invention includes:

a base station 501 and user equipment 502.

The base station 501 is configured to: configure indication signaling, and send the indication signaling to the user equipment.

The user equipment 502 is configured to: receive the indication signaling sent by the base station, and transmit an uplink signal in a target subframe of a corresponding target carrier based on the indication signaling.

In this embodiment, the uplink signal is transmitted in the target subframe of the target carrier based on the received indication signaling. Apparently, when the target carrier performs downlink transmission, for a larger quantity of carriers in downlink transmission, the indication signaling is used to enable a downlink subframe or an uplink subframe of the carrier to transmit the uplink signal. Apparently, in the present invention, channel reciprocity is effectively utilized.

Figure 9:
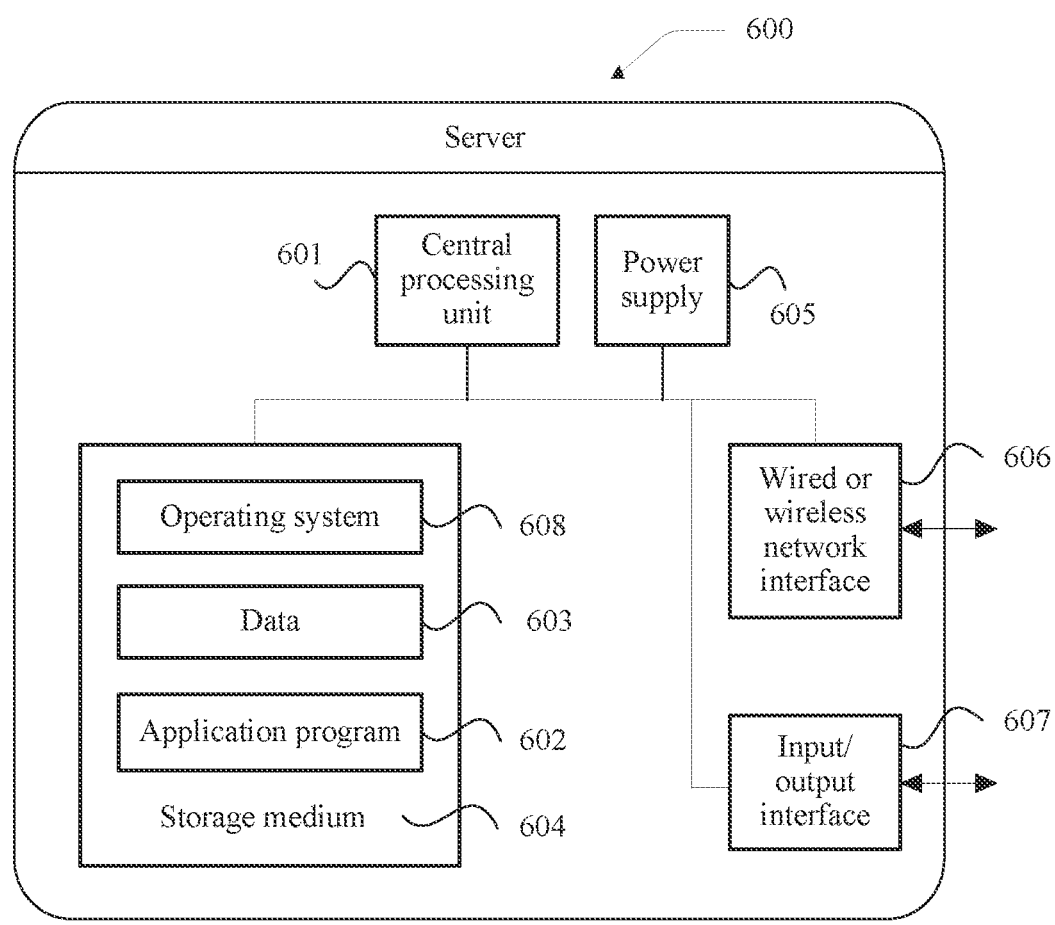
FIG. 9 is a schematic diagram of an embodiment of a server according to an embodiment of the present invention.

An embodiment of the present invention further provides a server. Referring to FIG. 9, an embodiment of the server according to this embodiment of the present invention includes the following content.

FIG. 9 is a schematic structural diagram of the server according to this embodiment of the present invention. The server 600 may differ greatly because of different configurations or performance, and may include one or more central processing units (central processing unit, CPU) 601 (for example, one or more processors), and one or more storage medium 604 (for example, one or more mass storage devices) that store an application program 602 or data 603. The storage medium 604 may be a transient storage or a persistent storage. A program stored in the storage medium 604 may include one or more modules (not shown in the figure), and each module may include a series of instruction operations to be performed on a switch. Further, the central processing unit 601 may be configured to communicate with the storage medium 604 to perform, on the server 600, a series of instruction operations in the storage medium 604.

The server 600 may further include one or more power supplies 605, one or more wired or wireless network interfaces 606, one or more input/output interfaces 607, and/or one or more operating systems 608, such as Windows Server™, Mac OS X™, Unix™, Linux™, or FreeBSD™.

In the foregoing embodiments, the steps performed by the UE, the base station, and the system may be based on the server structure shown in FIG. 9.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A base station, comprising:
    at least one processor coupled to at least one non-transitory computer-readable storage medium storing programming instructions for execution by the at least one processor, the programming instructions cause the base station to perform steps comprising:
    sending, by the base station, radio resource control (RRC) signaling to user equipment (UE), wherein the RRC signaling comprises indication signaling, wherein the indication signaling indicates a target carrier of which the UE transmits a sounding reference signal (SRS) in a target subframe, wherein the indication signaling comprises carrier indication information and the carrier indication information comprises a converted-from carrier index indicating a converted-from carrier and a converted-to carrier index indicating a converted-to carrier, wherein the target carrier is the converted-to carrier; and
    receiving, by the base station, the SRS in an uplink symbol of the target subframe in the target carrier from the UE, wherein the target subframe is a converted-to subframe that is converted from a downlink subframe comprising a downlink symbol, and the uplink symbol is converted from the downlink symbol of the downlink subframe.

2. The base station according to claim 1, wherein the steps further comprise:
    sending, by the base station, physical layer signaling to the UE, wherein the physical layer signaling indicates a carrier conversion, a subframe conversion, or both.

3. The base station according to claim 1, wherein the indication signaling further comprises at least one of a bandwidth occupied by an uplink signal, a transmission mode, a transmit port, a cyclic shift, timing advance, or a power control parameter.

4. The base station according to claim 1, wherein the indication signaling is semi-statically configured by the RRC signaling with a semi-static configuration.

5. The base station according to claim 4, wherein the semi-static configuration has an applicable period that is configurable.

6. The base station according to claim 4, wherein the semi-static configuration is dynamically activated or deactivated.

7. The base station according to claim 1, wherein:
    the indication signaling further comprises carrier set information,
    the indication signaling further indicates a subframe mode, or
    the indication signaling further comprises carrier set information and further indicates a subframe mode.

8. The base station according to claim 7, wherein the subframe mode is a periodic mode, and a subframe in the subframe mode has a same period or different periods on different carriers.

9. The base station according to claim 1, wherein the target subframe further transmits downlink control information, downlink data information, or both.

10. A system, comprising a user equipment (UE) and a base station;
    the UE is configured to:
        receive radio resource control (RRC) signaling, wherein the RRC signaling comprises indication signaling, wherein the indication signaling comprises carrier indication information and the carrier indication information comprises a converted-from carrier index indicating a converted-from carrier and a converted-to carrier index indicating a converted-to carrier; and
        transmit a sounding reference signal (SRS) in an uplink symbol of a target subframe of a target carrier based on the indication signaling, wherein the target carrier is the converted-to carrier, the target subframe is a converted-to subframe that is converted from a downlink subframe comprising a downlink symbol, and the uplink symbol is converted from the downlink symbol of the downlink subframe;
    the base station is configured to:
        send the RRC signaling to user equipment; and
        receive the SRS in the uplink symbol of the target subframe in the target carrier.

11. The system according to claim 10, wherein the UE is further configured to: receive physical layer signaling from the base station, wherein the physical layer signaling indicates a carrier conversion, a subframe conversion, or both; and
    the base station is further configured to: send the physical layer signaling to the UE.

12. The system according to claim 10, wherein the indication signaling further comprises at least one of a bandwidth occupied by an uplink signal, a transmission mode, a transmit port, a cyclic shift, timing advance, or a power control parameter.

13. The system according to claim 10, wherein the UE is further configured to: configure a time-domain location and an occupied symbol length of an uplink signal.

14. The system according to claim 10, wherein the indication signaling is semi-statically configured by the RRC signaling with a semi-static configuration.

15. The system according to claim 14, wherein the semi-static configuration has an applicable period that is configurable.

16. The system according to claim 14, wherein the semi-static configuration is dynamically activated or deactivated.

17. The system according to claim 10, wherein:
    the indication signaling further comprises carrier set information,
    the indication signaling further indicates a subframe mode, or
    the indication signaling further comprises carrier set information and further indicates a subframe mode.

18. The system according to claim 17, wherein the subframe mode is a periodic mode, and a subframe in the subframe mode has a same period or different periods on different carriers.

19. The system according to claim 10, wherein the target subframe further transmits downlink control information, downlink data information, or both.

* * * * *